US006799163B2

(12) United States Patent
Nolan (10) Patent No.: US 6,799,163 B2
(45) Date of Patent: Sep. 28, 2004

(54) BIOMETRIC IDENTIFICATION SYSTEM (75) Inventor: Marc Edward Nolan, Woodstock, GA (US)

(73) Assignee: VAS International, Inc., Woodstock, GA (US)

( * ) Notice: Subject to any disclaimer, the term of this patent is extended or adjusted under 35 U.S.C. 154(b) by 186 days.

(21) Appl. No.: 10/242,658

(22) Filed: Sep. 13, 2002

(65) Prior Publication Data

US 2003/0229492 A1 Dec. 11, 2003

Related U.S. Application Data (60) Provisional application No. 60/385,554, filed on Jun. 5, 2002.

(51) Int. Cl.$^7$ .............................................. G10L 17/00
(52) U.S. Cl. ..................... 704/273; 704/246; 379/88.02
(58) Field of Search ................................ 704/246, 247, 704/231, 250, 270, 273; 379/88.01, 88.02

(56) References Cited

U.S. PATENT DOCUMENTS

| | | | |
|---|---|---|---|
| 4,360,875 A | * 11/1982 | Behnke ..................... 455/456.5 |
| 4,827,518 A | 5/1989 | Feustel et al. ................. 381/42 |
| 5,577,120 A | 11/1996 | Penzias ......................... 380/23 |
| 5,937,381 A | 8/1999 | Huang et al. ................ 704/247 |
| 6,246,751 B1 | * 6/2001 | Bergl et al. ................. 379/67.1 |
| 6,246,987 B1 | 6/2001 | Fisher et al. ................. 704/273 |
| 6,246,988 B1 | 6/2001 | Schier ......................... 704/273 |
| 6,335,688 B1 | 1/2002 | Sweatte .................... 340/573.1 |
| 6,356,868 B1 | 3/2002 | Yuschik et al. .............. 704/246 |
| 6,374,212 B2 | 4/2002 | Phillips et al. .............. 704/231 |
| 6,382,516 B1 | 5/2002 | King ........................... 235/492 |
| 6,386,451 B1 | 5/2002 | Sehr ............................ 235/384 |
| 6,389,397 B1 | 5/2002 | Otto ............................ 704/270 |
| 6,400,806 B1 | * 6/2002 | Uppaluru ................. 379/88.02 |
| 6,401,066 B1 | * 6/2002 | McIntosh .................... 704/273 |
| 6,411,926 B1 | 6/2002 | Chang ........................ 704/221 |
| 6,424,703 B1 | 7/2002 | Katz ........................ 379/93.13 |
| 6,490,560 B1 | 12/2002 | Ramaswamy et al. ...... 704/250 |
| 6,607,136 B1 | * 8/2003 | Atsmon et al. ............. 235/492 |

* cited by examiner

Primary Examiner—Susan McFadden
(74) Attorney, Agent, or Firm—Jagtiani + Guttag

(57) ABSTRACT

In one embodiment the present invention provides a method for identity verification comprising the steps of: (a) comparing at least one first spoken voice print of a user speaking at least one piece of personal data against a first stored voice print of the user speaking said at least one piece of personal data; (b) comparing at least one second spoken voice print of the user speaking at least one piece of travel data against a second stored voice print of the user speaking said piece of travel data; and (c) determining if the user is a given individual based the results of step (a) and step (b). In other embodiments, the present invention provides a method for controlling the use of an object or service comprising the steps of: (a) comparing at least one first spoken voice print of a user speaking at least one piece of personal data against a first stored voice print of the user speaking said at least one piece of personal data; (b) comparing at least one second spoken voice print of the user speaking at least one piece of object identification data or service identification data against a second stored voice print of the user speaking said piece of object identification data; and (c) determining if the user is allowed to use said object or service based on the results of steps (a) and (b).

80 Claims, 5 Drawing Sheets

BIOMETRIC IDENTIFICATION SYSTEM

This application claims priority of application number 60/385,554 filed Jun. 5, 2002.

BACKGROUND OF THE PRESENT INVENTION

1. Field of the Present Invention

The present invention relates generally to methods of identification and tracking of an individual using biometrics.

2. Description of the Prior Art

It is known in the art to use account numbers, passwords, and/or personal identification numbers (PINs) to identify authorized users, control access to specific locations. Unfortunately, the methods for controlling access can be easily compromised. Account numbers, passwords, PINs, etc. can be discovered by non-authorized persons or this information can be willingly disclosed by authorized users to non-authorized persons. Once these security measures are compromised, non-authorized persons may obtain access to sensitive databases or computer systems or entry into the U.S.

There are also methods for identifying a person based upon the unique characteristics of that person's voice (biometrics). Existing computer models are capable of almost real time identification of a spoken voice sample, a previously recorded voice print contained within a database. Upon receiving a current voice sample, a computer scores the comparison of the real time voice sample with the previously recorded voice print contained in a database. If the score meets certain criteria, then the identity of the person who input the real time voice sample is confirmed to be the same as the identity of the person who submitted the recorded voice print. The advantage of this method is that the unique nature of a person's voice generally cannot be imitated by another person. It is highly unlikely a voice print match can be achieved by anyone other than the person who submitted the originally recorded voice print However, a problem in current user identification systems is that there is a clash between two important objectives: providing a user identification validation process that is accurate and providing a user identification validation process that is fast. Many user identification systems comprise simple password systems, where the user provides a password, or keypunches in a multi-character alphanumeric code to gain access to a location. Such systems are subject to unauthorized users thwarting the security by means of a number of code-breaking procedures. Thus, convenience of use is gained in such systems at the cost of having the overall security provided reduced.

Additionally, processes that employ personal identification codes that are manually entered into a keypad, can be entered by any individual. Tracking the entry, exit of a manually entered personal identification code does not ensure that the person entering the personal identification code is the person who is assigned to the personal identification code.

One typical example of a security system employing manually entered identification codes is U.S. Pat. No. 5,255, 183 to Katz, which discloses a computer system for recording remotely, through a telephone network, the arrival and departure times of field based employees at various work sites. The system detects from a calling employee automatic number identification data (ANI) and further accepts personal identification codes from the caller. The ANI is used to identify the calling telephone. Again however, there is no method by which the system disclosed in Katz can truly verify the identity of the individual calling in. Unscrupulous workers might have their friend or colleague type in their code for them.

Where additional security and positive identification of an individual are required, more stringent screening methods are available. A user wishing to gain access to a high security facility or computer/data storage system must have their identity validated in a highly reliably manner. The most accurate forms of positive user identification involve the examination of some immutable physical characteristic of the user that would be unique to each and every individual. Such systems include: retina scan systems, voice print identification systems, fingerprint identification systems, DNA scanners and other identification methods in the field of biometrics. However, the drawbacks to the above options are, historically, that such systems required a significant amount of time to perform the user identification processing and significantly sized database requirements to store the information of several thousand individuals and a large price tag.

A voice print identification system is a particularly effective user identification system since the user validation process is highly accurate and positively identifies an individual based upon the use of a prerecorded voice print of a user. In actual use, a user initially inputs a predetermined spoken phrase into the voice print database. This voice print is then used as the basis for comparison against which future user voice prints are measured. Each time the user wishes to gain access to a specific location that is protected by a voice identification system, the user will speak the predetermined sample into the voice identification system, where it is compared against the stored comparison voice print. The user can provide this voice input over a call connection on a telecommunication network to the voice print comparison database, so identity can be positively identified from anywhere there is telephone or network capability. The largest benefit of this method is that voice identification systems are generally immune to variations in the user's voice and cannot be thwarted by imitators who may even have undergone cosmetic surgery to enhance their appearance to the individual they seek to imitate.

Voice biometric identification systems also bypass another roadblock typically encountered by security agencies. Traditionally, a person must possess a man-made personalized token to gain access or authorization to enter a secure location. Tokens such as magnetic ink encoded paper checks, smart cards, magnetic swipe cards, identification cards or even a personal computer programmed with resident user-specific account data are "personalized" because they are each programmed or encoded with data that is unique and personalized to the authorized user. At secure locations, individuals directly possess or physically present personalized identity, security cards imprinted with text, or graphics identifying the individual along with perhaps a magnetic encoded stripe or microchip with the individual's access information to a security agent. But what happens if the individual forgot his security token at home that day? Or perhaps, an imitator has stolen the token from the authorized individual and is using it to enter the secure location. By contrast, as the disclosed invention involves a method of using biometrics instead of some form of a token, the authorized individuals would not directly possess, carry or even remember any personalized token that could then be lost, stolen or damaged.

In light of the tragic event that occurred on Sep. 11, 2001, in the United States, there exists the need for a global identification, voice verification, authorization/identification system. Currently in the United States it is difficult for law enforcement personal to easily detect forged identification documents carried by immigrants to the U.S. There is also no easy method to determine whether an immigrant stopped by police is in the U.S. illegally or perhaps has an expired visa. There exists the need for a system which is easily administered by law enforcement individuals that will positively identify an individual despite potential disguises or forged documents, is quickly and easily employed and that has the ability to alert law enforcement individuals of additional relevant information concerning the individual. This additional information might be a photograph of the individual or other biometric information, or might also be information such as the individual's visa status. Currently there is no method for providing law enforcement or security officers with this information.

SUMMARY OF THE PRESENT INVENTION

It is therefore an object to provide a method to record an individual's biometric information into a database.

It is yet another object of the present invention to provide a method that can positively identify individuals through the use of comparing an individual's biometrics with the individual's biometrics previously stored in a database.

It is a further aspect of the above method to provide a portable device to positively identify individuals by transmitting biometric information of an individual over a wireless network to a database that then confirms or denies the identity of the individual and sends this information back over the wireless network to the portable device.

According to a first broad aspect of the present invention, there is provided a method for identity verification comprising the steps of: (a) comparing at least one first spoken voice print of a user speaking at least one piece of personal data against a first stored voice print of the user speaking said at least one piece of personal data; (b) comparing at least one second spoken voice print of the user speaking at least one piece of travel data against a second stored voice print of the user speaking said piece of travel data; and (c) determining if the user is a given individual based the results of step (a) and step (b).

According to a second broad aspect of the present invention, there is provided a machine readable medium storing instructions that, if executed by a computer system, causes the computer system to perform a set of operations comprising the steps of: (a) comparing at least one first spoken voice print of a user speaking at least one piece of personal data against a first stored voice print of the user speaking said at least one piece of personal data; (b) comparing at least one second spoken voice print of the user speaking at least one piece of travel data against a second stored voice print of the user speaking said piece of travel data; and (c) determining if the user is a given individual based the results of step (a) and step (b).

According to a third broad aspect of the present invention, there is provided a computer system implementing a method for identity verification comprising the steps of: (a) comparing at least one first spoken voice print of a user speaking at least one piece of personal data against a first stored voice print of the user speaking said at least one piece of personal data; (b) comparing at least one second spoken voice print of the user speaking at least one piece of travel data against a second stored voice print of the user speaking said piece of travel data; and (c) determining if the user is a given individual based the results of step (a) and step (b).

According to a fourth broad aspect of the present invention, there is provided a method for controlling the use of an object comprising the steps of: (a) comparing at least one first spoken voice print of a user speaking at least one piece of personal data against a first stored voice print of the user speaking said at least one piece of personal data; (b) comparing at least one second spoken voice print of the user speaking at least one piece of object identification data against a second stored voice print of the user speaking said piece of object identification data; and (c) determining if the user is allowed to use said object based on the results of steps (a) and (b).

According to a fifth broad aspect of the present invention, there is provided a machine readable medium storing instructions that, if executed by a computer system, causes the computer system to perform a set of operations comprising the steps of: (a) comparing at least one first spoken voice print of a user speaking at least one piece of personal data against a first stored voice print of the user speaking said at least one piece of personal data; (b) comparing at least one second spoken voice print of the user speaking at least one piece of object identification data against a second stored voice print of the user speaking said piece of object identification data; and (c) determining if the user is allowed to use said object based on the results of steps (a) and (b).

According to a sixth broad aspect of the present invention, there is provided a computer system implementing a method for controlling access to a portable electronic device comprising the steps of: (a) comparing at least one first spoken voice print of a user speaking at least one piece of personal data against a first stored voice print of the user speaking said at least one piece of personal data; (b) comparing at least one second spoken voice print of the user speaking at least one piece of travel data against a second stored voice print of the user speaking said piece of travel data; and (c) determining if the user is a given access to the portable electronic device based on the results of steps (a) and (b).

According to a seventh broad aspect of the present invention, there is provided a method for controlling the use of a service comprising the steps of: (a) comparing at least one first spoken voice print of a user speaking at least one piece of personal data against a first stored voice print of the user speaking said at least one piece of personal data; (b) comparing at least one second spoken voice print of the user speaking at least one piece of service identification data against a second stored voice print of the user speaking said piece of service identification data; and (c) determining if the user is allowed to use said service based on the results of steps (a) and (b).

According to an eighth broad aspect of the present invention, there is provided a machine readable medium storing instructions that, if executed by a computer system, causes the computer system to perform a set of operations comprising the steps of: (a) comparing at least one first spoken voice print of a user speaking at least one piece of personal data against a first stored voice print of the user speaking said at least one piece of personal data; (b) comparing at least one second spoken voice print of the user speaking at least one piece of service identification data against a second stored voice print of the user speaking said piece of service identification data; and (c) determining if the user is allowed to use said service based on the results of steps (a) and (b).

According to a ninth broad aspect of the present invention, there is provided a computer system implementing a method for controlling access to a portable electronic device comprising the steps of: (a) comparing at least one first spoken voice print of a user speaking at least one piece of personal data against a first stored voice print of the user speaking said at least one piece of personal data; (b) comparing at least one second spoken voice print of the user speaking at least one piece of service identification data against a second stored voice print of the user speaking said piece of service identification data; and (c) determining if the user is allowed to use said service based on the results of steps (a) and (b).

Other objects, features of the present invention will be apparent from the following detailed description of the preferred embodiment.

BRIEF DESCRIPTION OF THE DRAWINGS

The invention will be described in conjunction with the accompanying drawings, in which.

DETAILED DESCRIPTION OF THE PREFERRED EMBODIMENT

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, the term "portable electronic device" includes any electronic device that may be carried by a user. Such portable electronic devices include personal data assistants (PDAs), laptop computers, cell phones, etc.

For the purposes of the present invention, the term "computer" refers to a programmable electronic device that may process data. Examples of computers include mainframe, desktop workstation, laptop computer, notebook computer, personal digital assistant, telephone, wireless telephone, etc.

For the purposes of the present invention, the term "computer system" refers collectively to a computer and all of the electronic devices, including possibly other computers, connected to the computer either permanently or temporarily by a communications link. Examples of computer systems include computer networks, a PDA in communication with a central server, computers linked through the Internet, etc.

For the purposes of the present invention, the term "communications link" refers to a connection that allows one electronic device to send data to another electronic device. Examples of communications links include modem cable, telephone line, network cable, satellite, radio waves, sound waves, light waves, etc.

For the purposes of the present invention, the term "personal data" refers to data generally associated with a person in that person's everyday life. Such data includes a person's first name, middle name, last name, address, telephone number, passport number etc.

For the purposes of the present invention, the term "travel data" refers to any data associated with the travel of an individual. Such data includes an individual's departure date and or time, an individual's arrival date and/or time, an individual's mode of travel, gate of departure, seat assignment, meal choice, class of seat, class of service, etc.

For the purposes of the present invention, the term "object identification data" refers to data or a code associated with identifying a particular object such as an electronic device to be used, a vehicle to be rented, a test to be taken, etc. The identification data may be alphanumeric or any other type of identification data or code used to identify an object.

For the purposes of the present invention, the term "use of an object" refers to a user using an object in a conventional manner such as inputting data into a PDA, using a piece of software on a laptop, receiving a call on a cell phone, renting a truck, being allowed to continue to use a truck after stopping a checkpoint, taking a test or submitting the results of a test, etc.

For the purposes of the present invention, the term "service identification data" refers to data or a code associated with identifying a particular service, such as an access code to allow a user to receive medical services, an identification number on a paycheck a user is to receive as government aid, etc. The identification data may be alphanumeric or any other type of identification data or code used to identify an object.

For the purposes of the present invention, the term "use of a service" refers to a user using an object in a conventional manner such as receiving medical services, receiving governmental aid, etc.

For the purposes of the present invention, the term "alert" refers to any type of alert including audible or visual alerts/alarms as well as the transmission of an alert by phone, through a computer network, wirelessly, etc. to the appropriate authorities.

For the purposes of the present invention, the term "flagged signal" refers to any biometric identification system operator defined criterion that is met by the result of combined data relation. An example could include notifying a security agency of individuals who exceed a period of time within an area without exiting.

For the purposes of the present invention, the term "identification Signal" refers to any result returned by a biometric identification system during the use of the biometric identification system in positively identifying individuals entering, exiting or while within a specific area.

For the purposes of the present invention, the term "security agency" refers to any agency, group, organization, department, or similar individual(s) who would be responsible for taking action in the event of an identification signal or flagged signal is sent by a biometric identification system for the purpose of notifying appropriate personnel to a specific piece of information.

Description

In one embodiment, the verification system includes a voice print verification system configured to compare two or more samples of voice and pattern match the voice samples to determine if the two or more samples were spoken by the same individual. An embodiment of the present invention having the voice print system may include a hardware interface within the voice response unit. The voice print system analyzes a voice sample, such as an individual speaking the individual's first, last name. This voice sample analysis is stored and may be appended to the record data or stored separately. The voice sample is the voice print of the individual whereby through the use of complex sampling and statistical analysis, a unique identification of the speaker's speech patterns, inflections, tone and speech speed is created. This unique identification or fingerprint is then cataloged and stored with the particular record number.

If, at a later time, the consent or response of a person is questioned, the stored voice print may be compared to a second sample taken from the individual. For example, if the individual refutes the recorded verification then they can call and undergo a second sampling, such as by speaking their first, last name. The voice print system analyzes the second sample and compares the results of the second sample to the stored results of the first sample. If the sample results match, then further conformation or verification is achieved. An example of a voice verification system compatible with this embodiment of the present invention is the Voicevault™ system available from Voicevault (formerly Buytel).

The system of the present invention may be used as part of the security system for a transportation complex, or other building security, where passengers or persons entering a building approach a check-in point or check-in counter, must undergo a positive identification (ID) by fingerprint scan, retinal scan, or any other means of positive identification. A digital photograph can then be taken of the person. This data plus the positive ID data and optional data about the person including a scan of a government supplied ID like a drivers license or passport is entered in a database and checked against various law enforcement databases such as FBI or others for law enforcement interest in the person.

The system of identification of the present invention may be used when the person enters a secure gate area, boards or leaves an aircraft, etc. In addition, the system can determine the identity of an individual even if he or she undergoes cosmetic changes to their appearance. The system detects any undesirable person attempting access into the airport or other transportation complex, provides a means for notifying security or law enforcement personnel. In addition, immigration or customs can be notified about any undesirable person arriving in an airport. The system also allows airline personnel and security personnel to know when an unexpected or unwanted event or person is in the system.

In one preferred embodiment, the present invention provides a method or apparatus employing voice identification techniques to ensure only authorized users obtain entry or exit from a location. Potential users dial an access number and speak to a security system using a standard telephone, over the Internet, etc. The security system compares the real time voice input to a previously recorded voice print obtained from the authorized user. If the comparison scores high enough to meet a previously established criteria, the user is identified as the authorized user who submitted the previously recorded voice print and the security system then permits the entry or exit from a location. If the security system fails to identify the individual or identifies the individual as someone other than who he or she claims to be, or identifies the individual as someone whom law enforcement has an interest in, then security or law enforcement is notified of the individual.

The method or system of the present invention may be used for tracking individuals as they enter or exit specific locations. Individuals have access to telephones, the Internet and other identification devices that the individual can use to communicate with a remote computer. The computer uses information received during the communication to identify, authenticate the identity of the individual marking the communication and the location of the client at the time of the communication. Authentication is accomplished by obtaining unique biometric parameters from a client over the phone and comparing those to biometric parameters in a database. Biometric data can include a voice print sampled during the call, or a finger or retinal print electronically transmitted during the call. Because each of these identifiers results from a physiological characteristic which is unique to the client, the system assures that the identified individual is the individual he or she claims to be, allowing the individual to proceed on their way. If the security system fails to identify the individual or identifies the individual as someone other than who he or she claims to be, or identifies the individual as someone whom law enforcement has an interest in, then security or law enforcement is notified of the individual.

The present invention also provides a tokenless biometric identification computer system, comprising at least a database containing registered biometric samples of users. A comparator compares a submitted biometric sample of a user to at least one registered biometric sample contained within a database wherein the submitted biometric sample may be obtained directly from the user during an identification process for allowing entrance or exit from a specific location by the user. No man-made personal devices such as identity cards, security cards, visas or the like are used during the identification process for verification of an individual's identity. If the comparator fails to identify the individual or identifies the individual as someone other than who he or she claims to be, or identifies the individual as someone whom law enforcement has an interest in, then security or law enforcement is notified of the individual.

The system of the present invention may be used to record biometrics of individuals for use in determining identification of individuals at a later date, track predetermined individuals in a specific area. The system of the present invention ensures that the individuals entering and exiting a specific area are positively identified, allows for periodic checking of individuals inside a specific area to be positively identified, and notifies third party security or enforcement agencies if an individual fails positive identification. The system of the present invention may accept and return information over a wireless system, may record specific information regarding each individual entering, exiting, or while within an area such as date, time, location of entering, exiting, or position within an area, into a database, and may be used to notify third party security or government agencies if certain criteria are met or not met, to include but not limited to, the length of stay of an individual within an area.

Figure 1A:
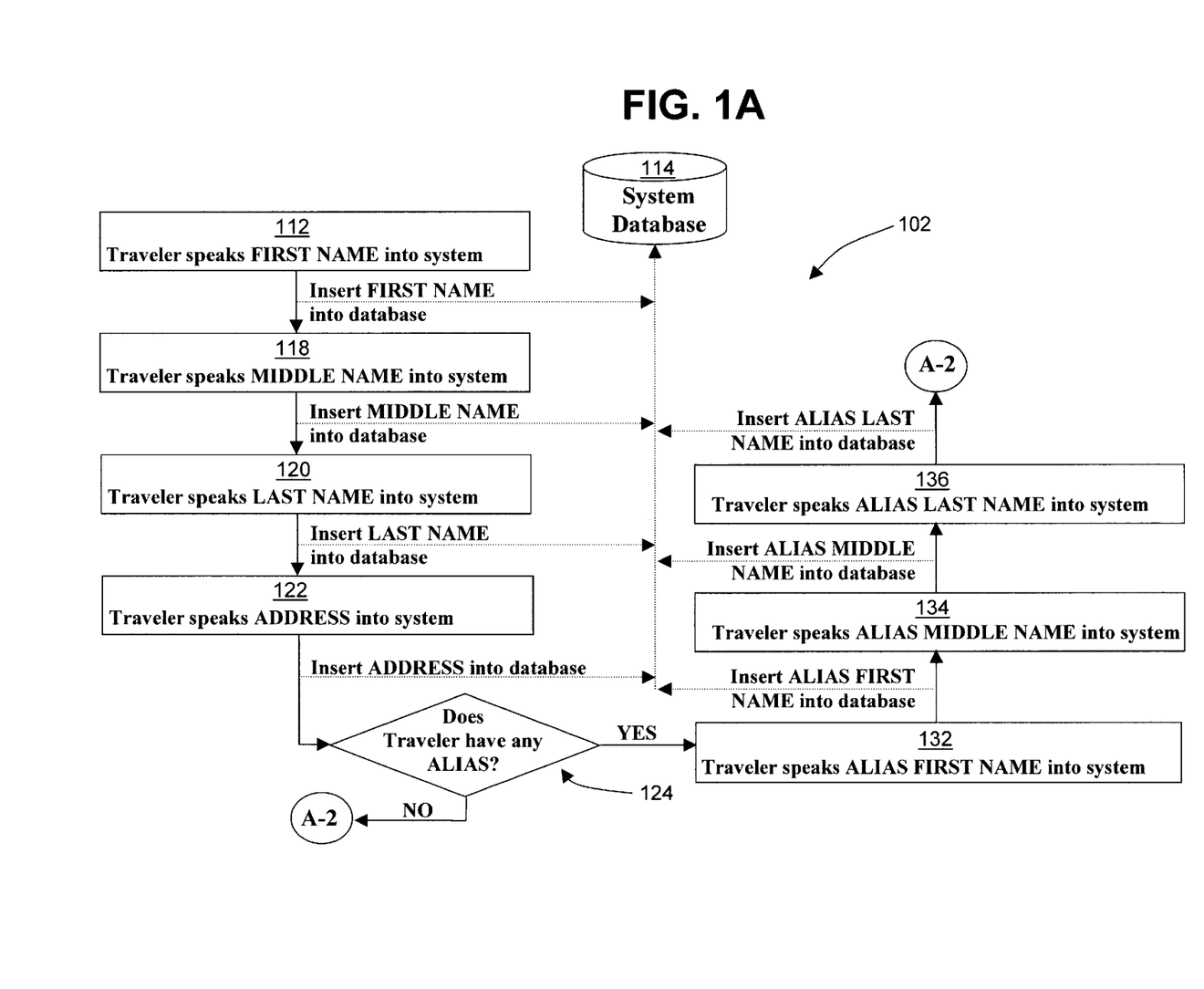
FIG. 1A is one section of a flowchart illustrating a method for registering a traveler according to a preferred embodiment of the present invention.

FIG. 1A shows section A-1 of a flowchart 102 illustrating a preferred embodiment of the present invention in which a computer system employing the system of the present invention is used to register a traveler into a database for use with a validation system of the present invention. At box 112 a traveler speaks the traveler's first name into a voice input device (not shown), the voice print of the traveler's first name is inserted into a system database 114 and the system passes control to box 118. At box 118 the traveler speaks the traveler's middle name into the voice input device, the voice print of the traveler's middle name is inserted into system database 114 and the system passes control to box 120. At box 120 the traveler speaks the traveler's last name into the voice input device, the voice print of the traveler's last name is inserted into system database 114 and the system passes control to box 122. At box 122 the traveler speaks the traveler's address into the voice input device, the voice print of the traveler's address is inserted into system database 114 and the system passes control to decision diamond 124. At decision diamond 124, if the traveler has an alias, the traveler speaks the word "Yes" into the voice input device and control passes to box 132. At box 132 a traveler speaks the traveler's alias first name into a voice input device (not shown) and the voice print of the traveler's alias first name is inserted into a system database 114 and the system passes control to box 134. At box 134 the traveler speaks the traveler's alias middle name into the voice input device and the voice print of the traveler's alias middle name is inserted into system database 114 and the system passes control to box 136. At box 136 the traveler speaks the traveler's alias last name into the voice input device, the voice print of the traveler's alias last name is inserted into system database 114 and the system passes control to box 142 of section A-2 of flowchart 102, shown in FIG. 1B. At decision diamond 124, if the traveler does not have an Alias, the traveler speaks the word "No", control passes to box 142 shown in section A-2 of flowchart 102, shown in FIG. 1B.

Figure 1B:
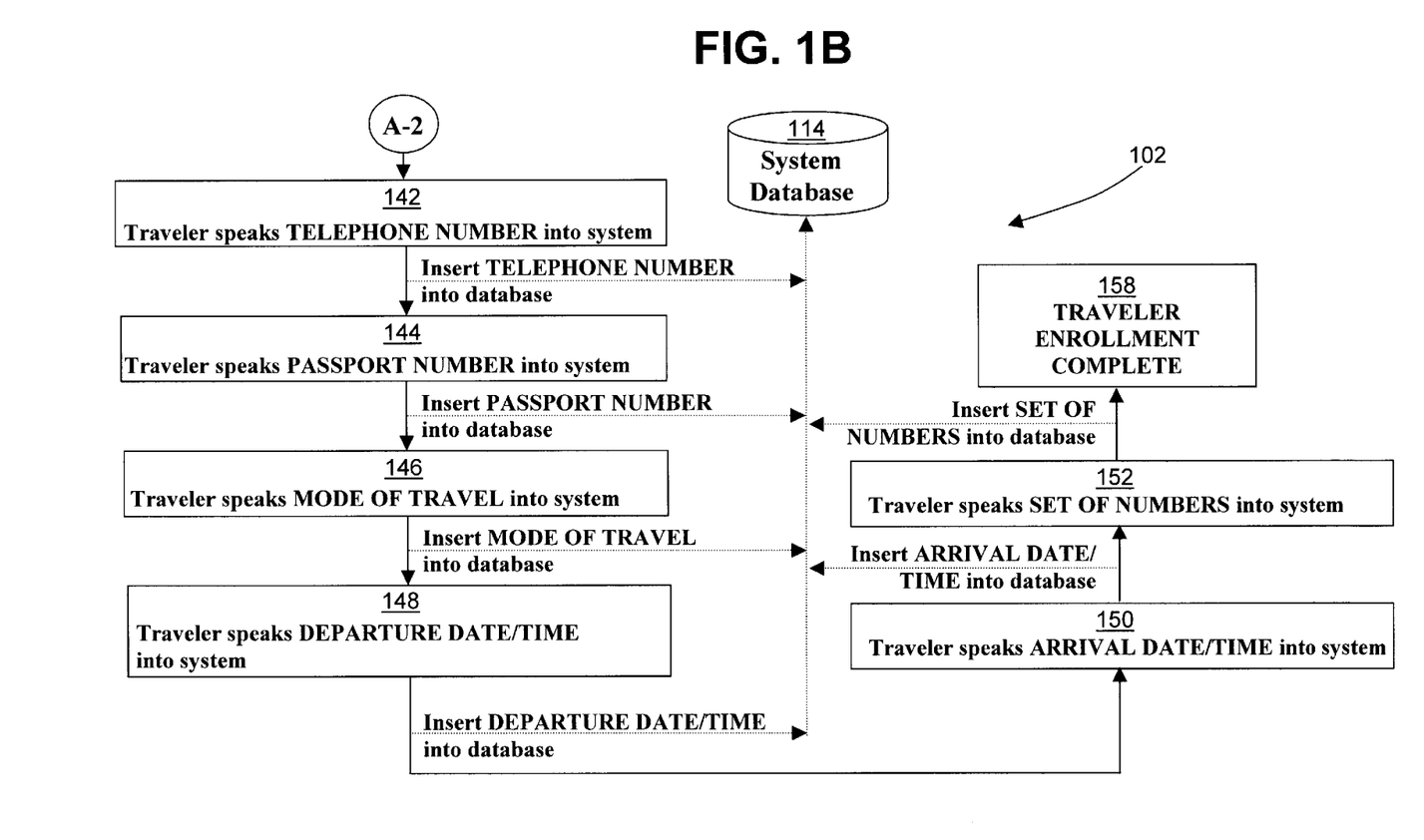
FIG. 1B is a second section of the flowchart of FIG. 1A.

At box 142 the traveler speaks the traveler's telephone number into the voice input device, the voice print of the traveler's telephone number is inserted into system database 114 and the system passes control to box 144. At box 144 the traveler speaks the traveler's passport number into the voice input device, the voice print of the traveler's passport number is inserted into system database 114 and the system passes control to box 146. At box 146 the traveler speaks the traveler's mode of travel into the voice input device, the voice print of the traveler's mode of travel is inserted into system database 114 and the system passes control to box 148. At box 148 the traveler speaks the traveler's departure date/time into the voice input device, the voice print of the traveler's departure date/time is inserted into system database 114 and the system passes control to box 150. At box 150 the traveler speaks the traveler's arrival date/time into the voice input device, the voice print of the traveler's arrival date/time is inserted into system database 114 and the system passes control to box 152. At box 152 the traveler speaks a set of numbers into the voice input device, the voice print of the traveler's set of numbers is inserted into system database 114 and the traveler is now considered to be enrolled by the system as indicated by box 158.

One reason that a traveler may be requested to speak a set of numbers in the embodiment described above is that when the system of the present invention is first used to collect data for the traveler, the system may request the traveler to speak a random or ordered set of numbers into the system. For example, when the traveler speaks information during the registration process for the system, the traveler may be requested to repeat the numbers 1,2,3,4,5,6,7,8,9,0 into the system. During the verification procedure, the traveler may be requested to speak back a set of one or more of these numbers, either randomly or in order and the voice print of the traveler speaking the set of numbers is compared to voice prints of the traveler for each of the numbers of for a set of numbers such as "4,5,6", "6,7,8", etc.

Figure 2:
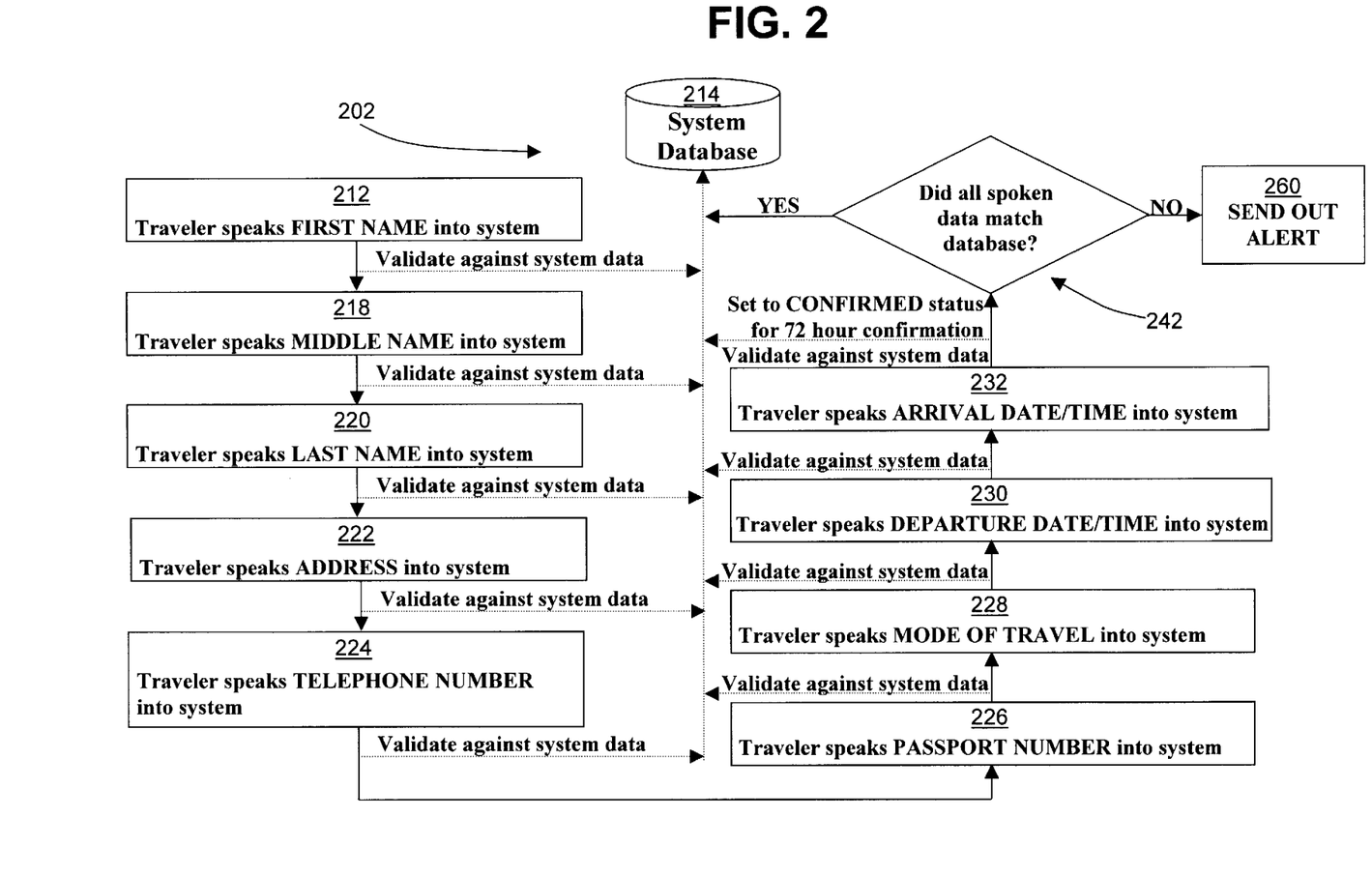
FIG. 2 is a flowchart illustrating a method for conducting a pre-travel confirmation process according to a preferred embodiment of the present invention.

FIG. 2 shows a flowchart 202 illustrating a preferred embodiment of the present invention in which a computer system employing the system of the present invention is used to conduct a 72 hour in advance pre-travel confirmation process. At box 212 a traveler speaks the traveler's first name into a voice input device (not shown), the voice print of the traveler's first name is validated against the first name voice print in a system database 214 and the system passes control to box 218. At box 218 the traveler speaks the traveler's middle name into the voice input device, the voice print of the traveler's middle name is validated against the middle name voice print in system database 214 and the system passes control to box 220. At box 220 the traveler speaks the traveler's last name into the voice input device, the voice print of the traveler's last name is validated against the last name voice print in the system database 214 and the system passes control to box 222. At box 222 the traveler speaks the traveler's address into the voice input device, the voice print of the traveler's address is validated against the address voice print for the traveler in the system database 214 and the system passes control to box 224. At box 224 the traveler speaks the traveler's telephone number into the voice input device, the voice print of the traveler's telephone number is validated against the telephone number voice print for the traveler in system database 214 and the system passes control to box 226. At box 226 the traveler speaks the traveler's passport number into the voice input device, the voice print of the traveler's passport number is validated against the passport voice print for the traveler in system database 114 and the system passes control to box 228. At box 228 the traveler speaks the traveler's mode of travel into the voice input device, the voice print of the traveler's mode of travel is validated against the mode of travel voice print for the traveler in system database 214 and the system passes control to box 230. At box 230 the traveler speaks the traveler's departure date/time into the voice input device, the voice print of the traveler's departure date/time is validated against departure date/time voice print in system database 214 and the system passes control to box 232. At box 232 the traveler speaks the traveler's arrival date/time into the voice input device, the voice print of the traveler's arrival date/time is validated against arrival date/time voice print system database 214 and the system passes control to decision diamond 242. If all of the voice prints for the data spoken by the traveler matches the voice prints for the traveler in database 214, the system sets the status of the traveler to confirmed for 72 hour in advance pre-travel confirmation. If any of the voice prints for the data spoken by the traveler do not match voice prints for the traveler in database 214, the system sends out an alert as indicated by box 260.

The voice print data in the database of the system shown in FIG. 2 may be generated using a registration process similar to the process described above and shown in FIGS. 1A and 1B.

Although the process illustrated in FIG. 2 is shown for use in performing 72 hour in advance pre-travel confirmations, the process of FIG. 2 may be used to perform any type of pre-travel confirmation such as 48 hours in advance, 24 hours in advance, etc. In addition, the process may include a step in which if all of the user's spoken voice prints match the voice prints in the system database, the traveler's reservation is set to "confirmed" status and the traveler is informed to proceed with the traveler's travel plans.

The process illustrated in FIG. 2 may also be modified to be used as a check-in confirmation process at check-in checkpoint by informing the traveler that the traveler may proceed to the boarding area if the traveler's spoken voice prints match the stored voice prints in the system database. In addition, the process illustrated in FIG. 2 may be modified to be used as a check-in confirmation process, either at an initial check-in or at a check-in at a connection, by informing the traveler to continue boarding if the traveler's spoken voice prints match the stored voice prints in the system database. The process illustrated in FIG. 2 may also be modified to be used as an arrival confirmation process in which a traveler is informed to be cleared to pass through an arrival checkpoint if the traveler's spoken voice prints match the stored voice prints in the system database.

In an alternative embodiment, the system of the present invention may be used with a computer system that automatically calls the traveler after the traveler has arrived at a destination. The traveler may be called after a given period of time such as 2 weeks, 1 month or every month after arrival and required to speak into a phone to provide voice prints that may be compared with stored voice print data. If the computer system is unable to contact the traveler or the voice print of the data spoken by the traveler does not match the voice print for the data stored in the database, an alert may be sent out and the traveler may be detained.

In another alternative embodiment, the system of the present invention may be used with a computer system that requires the traveler to call in to the computer system after the traveler has arrived at a destination. The traveler may be required to call in after a given period of time such as 2 weeks, 1 month or every month after arrival and required to speak into a phone to provide voice prints that may be compared with stored voice prints for the same data. If the traveler does not call in after the specified period of time or the voice print of the data spoken by the traveler does not match the voice print for the data stored in the database, an alert may be sent out and the traveler may be detained.

The traveler of the embodiments of the present invention shown in FIGS. 1A, 1B and 2 may be any type of person moving from place to place, including airline travelers, a person on parole, individuals who have traveled to the U.S. and are attempting to enter the U.S. under the current green card lottery program and any other countries' government program where there are persons with foreign visa's wanting to enter into another country, persons who have traveled to the U.S. and are seeking political asylum. The present invention may also be used for those people entering/exiting a country due to a sporting event, political, technical or social conferences etc.

Figure 3:
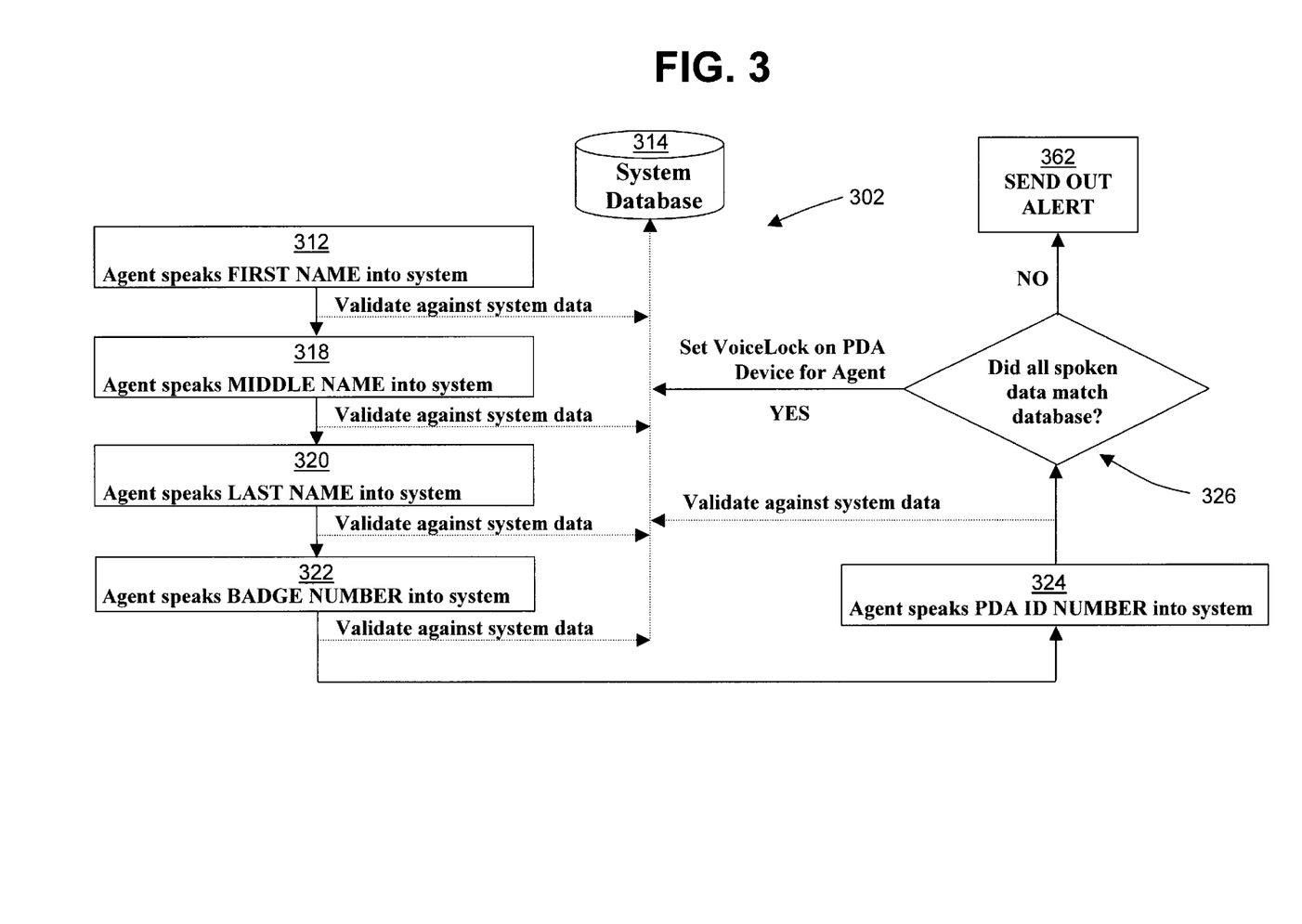
FIG. 3 is a flowchart illustrating a method for controlling the access to a PDA according to a preferred embodiment of the present invention.

FIG. 3 shows a flowchart 302 illustrating a preferred embodiment of the present invention in which a computer system employing the system of the present invention is used to control access to a PDA (not shown), such as a ViewSonic 1100 PC Tablet™. At box 312 a user, such as a security agent, speaks the user's first name into a voice input device (not shown), the voice print of the user's first name is validated against the first name voice print in a system database 314 and the system passes control to box 318. At box 318 the user speaks the user's middle name into the voice input device, the voice print of the user's middle name is validated against the middle name voice print in system database 314 and the system passes control to box 320. At box 320 the user speaks the user's last name into the voice input device, the voice print of the user's last name is validated against the last name voice print in the system database 314 and the system passes control to box 322. At box 322 the user speaks the user's badge number into the voice input device, the voice print of the user's badge number is validated against the address voice print for the user in the system database 314 and the system passes control to box 324. At box 324 the user speaks the identification number of the PDA the user wants to use into the voice input device, the voice print of the PDA identification number is validated against PDA identification number voice print for the user in system database 314 and the system passes control to decision diamond 326. If all of the voice prints of the data spoken by the user match the voice prints for the user in database 314, the system allows the user to use the PDA. If any of the voice prints of the data spoken by the user do not match the voice prints for the user in database 314, the system sends out an alert and/or disables the PDA as indicated by box 362.

The voice print that is verified may either be taken by speaking into the PDA itself or by speaking into a voice recording device near the PDA.

In another preferred embodiment of the system of the present invention, the system of the present invention may be used by a security agency such as the Department of Homeland Security Office that employs agents with PDAs. The agent(s) may be any person or agency assigned to the Homeland Security Office such as members of the CIA, FBI, Coast Guard, etc. In such an embodiment of the present invention, an agent may log onto a PDA device wirelessly using a voiceprint of personal information such as: first name, middle name, last name, agent ID, etc. and one or more voice print of one or more identification codes associated with the PDA the agent is attempting to use. The voice print data is checked against a system database. If there is a positive voice print match, the agent is allowed to use the device. If there is a negative voiceprint match, an alert is sent out and the device is disabled. Once the agent has access to the device, the agent is allowed to access records, send and receive emails, update applicant/traveler records, etc. If the agent needs to update a picture, the new picture is taken through the wireless device and saved in the system database and other Homeland Security Office databases may be updated as well. The verification system for granting access to the PDA may also employ other biometric security measures such as fingerprints, retina scans, facial image scans, etc. This embodiment of the present invention may have particular utility for Coast Guard or other types of government agents who want to be able to go aboard a ship, and be able to "identify" a traveler, who may have been on board for a long time, may have altered his appearance by growing or shaving beard, wearing glasses, etc. The present invention allows an agent to take an updated voice print and/or facial image and wirelessly connect and upload the new picture and send to one or more verification centers, each having voice print databases, over a large geographic area.

Although the embodiment of the present invention described above and shown in FIG. 3 is for use with granting access to a PDA, similar methods may be used for granting access to other objects. For example, the system of the present invention may be used to grant access to large trucks capable of carrying explosives by requiring a user to give voice prints for personal information for the user and identification data associated with a truck, such as the truck's serial number and the transport company that owns the truck, to be rented or used. In such a system, a voice print of the personal information and identification data would be taken, possibly over the phone, when a user requests to use the truck and the user would re-speak the personal information and identification data again when the user attempts to pick up the truck.

In another preferred embodiment, the system of the present invention may be used to verify the identity of truck drivers at weigh stations and other checkpoints at which a truck driver is required to stop. Copies of previously recorded voice prints for personal information of the truck driver and identification data associated with a truck, such as the truck's license plate would be compared with voice prints of the same personal information and truck identification data taken at the weigh station or checkpoint.

In another preferred embodiment, the system of the present invention may be used to verify whether a user taking a test is the proper test taker. In such a system, a voice print of the personal information and identification data, such as the serial number of the test taker's answer sheet, would be taken, either over the phone or in person, when a user registers for the test and the user would re-speak the personal information and identification data again when the user attempts to either pick up the answer sheet and/or submit the completed answer sheet for grading.

The system of the present invention could also be used for electronic tests where a user answers questions presented on the monitor of a computer. In such a system, a voice print of the personal information and identification data, such as a serial number assigned to the test taker's personal test, would be taken, either over the phone or in person, when a user registers for the test and the user would re-speak the personal information and identification data again to activate the computer that will administer the test.

Figure 4:
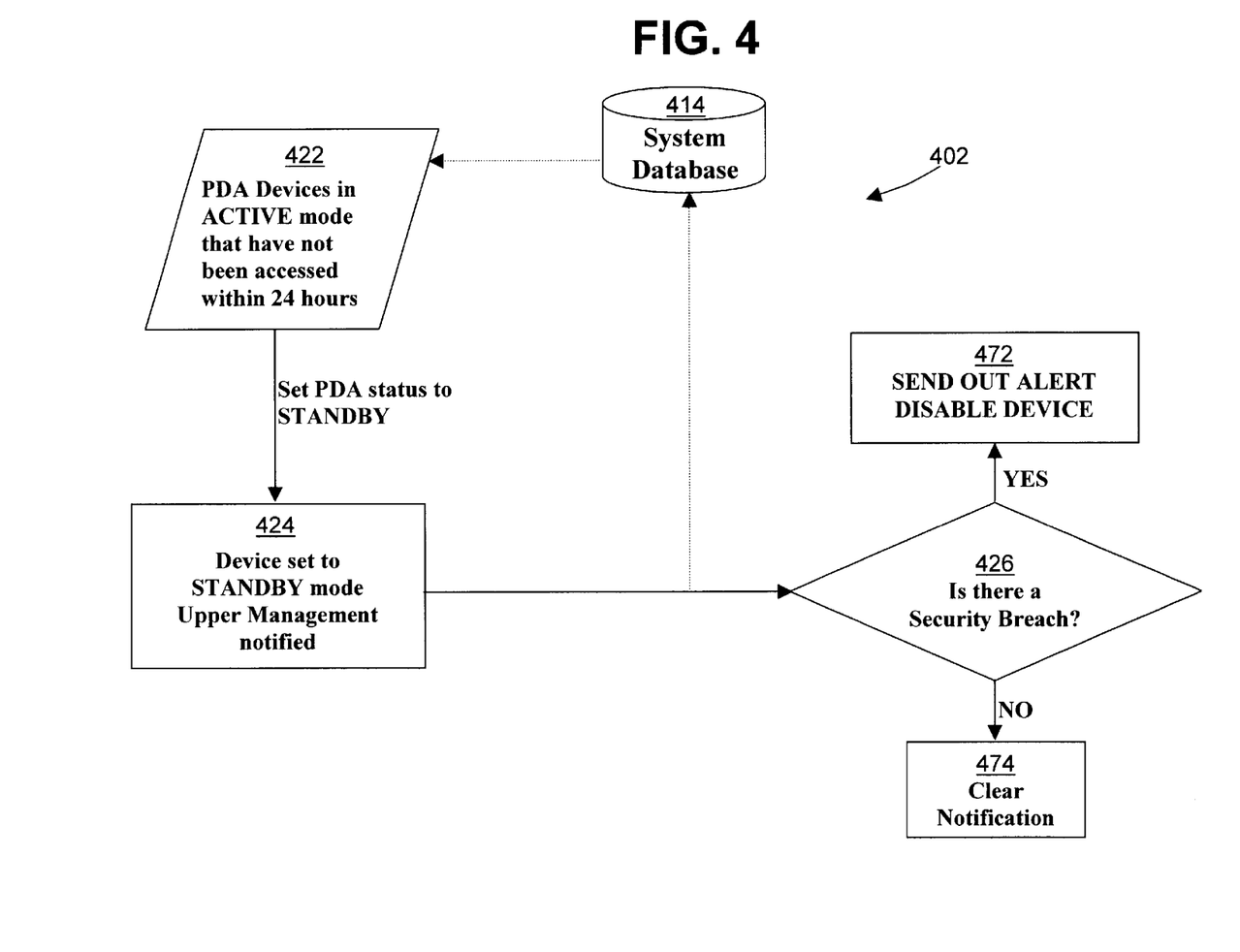
FIG. 4 is a flowchart illustrating a method for determining if a PDA is not in use according to a preferred embodiment of the present invention.

FIG. 4 shows a flowchart 402 illustrating a preferred embodiment of the present invention in which a computer system employing the system of the present invention is used to determine if a PDA (not shown) is no longer in use, possibly due to the user who is using the PDA, such as a security agent, becoming incapacitated. Such a system can be used to help send out a warning that the security agent has been incapacitated and to prevent an unauthorized user from possibly using the PDA. System database 414 sends out a signal to PDA devices in Active mode that have not been accessed in 24 hours as shown at box 422. Each PDA device that has not been accessed in the last 24 hours is set to Standby mode and the managers of the organization employing the security agent is notified as shown at box 424. At decision diamond 426, the system determines if there has been a security breach using a procedure similar to that shown in FIG. 3 and described above in which the user must speak the user's name and the identification code for the PDA in order to prevent the system from determining whether there has been a security breach. If the voice prints do not match the voice prints in system database 414 or no action is taken within a specified period of time after the device has been set to stand by, an alert is sent out by the system and the PDA device is disabled as indicated by box 472. If the voice prints do match, then the user is notified by the PDA that the user is clear and the PDA is re-activated as indicated by box 474.

In another preferred embodiment of the present invention, a system similar to the system described above for granting access to a truck may be used. The system of the present invention may be used to grant access to a train or the secured sections of a train station or railroad.

In another preferred embodiment, the system of the present invention may be used in conjunction with other biometric security systems such as fingerprint systems, retinal scans, face image scans, etc.

In another preferred embodiment, the present invention envisions verifying the identity of a user attempting to use medical services to prevent illegal immigrants from using medical services for which they cannot pay. Using the system of the present invention, before a user may receive medical services, the user would be required to enroll in the system at a time prior to the user's request for services by speaking appropriate voice print data, including an access code to receive hospital services, into the system either in person at a hospital or centralized registration center for several hospitals or by phone. The database may either be kept by the hospital, by a centralized database for several hospitals or by a government agency When the user attempts to use hospital services or upon discharge from the hospital, the user is required to speak appropriate data to create voice prints and the voice prints of the newly spoken voice prints are matched against appropriate voice prints in the database to verify the identity of the user. If there is not a match, then the user is detained and an alert is sent out. When registering, a user may be required to speak in several access codes and the user may be required to speak in a different one of these access codes each time the user attempts to receive medical services.

In another preferred embodiment the present invention envisions verifying the identity of a user attempting to use receive government aid. Using the system of the present invention, before a user may receive government aid, the user would be required to enroll in the system at a time prior to the user's request for services by speaking appropriate voice print data, including an access code to receive government aid, into the system either in person at a centralized registration center or by phone. The database may be kept by a government agency or a centralized database used for several government agencies When the user attempts to receive government aid, the user is required to speak appropriate data to create voice prints and the voice prints of the newly spoken voice prints are matched against appropriate voice prints in the database to verify the identity of the user. If there is not a match, then the user is detained and an alert is sent out. When registering, a user may be required to speak in several access codes and the user may be required to speak in a different one of these access codes each time the user attempts to receive governmental aid.

The present invention may employ various known voice recognition, voice print, and voice print verification technologies such as the technologies described in U.S. Pat. Nos. 6,424,249; 6,411,926; 6,386,451; 6,356,868; 6,335,688; 6,266,640; 6,246,988; 5,668,929; 5,577,120, the entire disclosures and contents of which are hereby incorporated by reference.

A preferred voice verification system that may be used with the present invention is Voicevault™ system owned by the company Voicevault. Included within the Voicevault™ system are the products Voicevaultnet™ (for use with networks), Voicevaultphone™ (for use with a phone system) and Voicevaultweb™ (for use with web-sites), and each of these products may be used with particular embodiments of the present invention.

In one typical embodiment of the Voicevault™ system, to activate a user, it is necessary for him or her to register for the use of the Password Reset service by dialing into the Voicevault™ system and following a short automated set of commands that require the user to provide a voice sample that is stored in a secure vault. In one embodiment of the Voicevault™ system, once the user is activated and the system prompts for a password reset, the user starts by placing a call, using any standard telephone handset (including cell phones), via the PSTN (public switched telephone network). An IVR (Interactive Voice Response) platform provided by the service provider, processes/answers the call and provides a customized greeting. The IVR identifies the employee's claimant ID by DTMF (Dual Tone Multiplexed Frequency). The IVR asks the employee to provide a specified spoken phrase, plus an identification number; this can be an employee's spoken account number, department number with an extra digit, telephone extension with an extra digit or the employee's identification card unique number. The verbal input and claimant ID are sent to the Voicevault™ Application Program Interface (API) for processing. The API can convert the recorded spoken phrase into a voiceprint. This is a local process because the newly created voiceprint file size is smaller than the non-processed spoken phrase and thus reduces the bandwidth requirements when sending the user information across the Internet.

Using the claimant ID, Voicevault™ retrieves the reference voiceprint. Voicevault™ verifies the employee, by comparing the employee's voiceprint and his or her reference voiceprint. Based on the computed score and the presiding threshold, Voicevault™ will provide an Accept or Reject decision and supply the score. Based on the Voicevault™ decision; the Password Reset Module is invoked and the service provider allocates a new password for the user.

Passwords are set to expire after a given period of time, such as 30 days, with reminders given when the expiration date is near. A minimum of six characters is required for a password, and the structure is enforced as alpha numeric. Immediate password changes are not permitted, and a password history is maintained to ensure that each change of password is structurally different. (The above description of the Voicevault™ system is based on information provided by Voicevault on the web-site for Voicevault™).

The present invention is advantageous over the previous voice identification methods, systems, devices and techniques because the present invention uses voice inputs that are generated when a transaction is being placed and are unique to the transaction. These inputs may change depending on the transaction. These inputs provide additional security and allow users to have multiple voice inputs for different transaction. In a preferred embodiment, the present invention may use voice inputs that are associated with a unique transaction, such as airline, flight number, airport, departure gate, seat assignment, food selection, etc. An individual would have one voice print that allows access to one flight and thus allows an individual to have multiple voice inputs for multiple flights.

Although the present invention has been fully described in conjunction with the preferred embodiment thereof with reference to the accompanying drawings, it is to be understood that various changes, modifications may be apparent to those skilled in the art. Such changes, modifications are to be understood as included within the scope of the present invention as defined by the appended claims, unless they depart therefrom.

What is claimed is:

1. A method for identity verification comprising the steps of:
   (a) comparing at least one first spoken voice print of a user speaking at least one piece of personal data against a first stored voice print of the user speaking said at least one piece of personal data;
   (b) comparing at least one second spoken voice print of the user speaking at least one piece of travel data against a second stored voice print of the user speaking said piece of travel data; and
   (c) determining if the user is a given individual based the results of step (a) and step (b).

2. The method of claim 1, wherein step (a) comprises comparing first spoken voice prints of at least two pieces of personal data against respective stored voice prints of the user speaking each of said pieces of personal data.

3. The method of claim 1, wherein step (b) comprises comparing first spoken voice prints of at least two pieces of travel data against respective stored voice prints of the user speaking each of said pieces of travel data.

4. The method of claim 1, further comprising the step of:
   (d) comparing at least one third spoken voice print of the user speaking at least one piece of alias data against a stored voice print of the user speaking said piece of alias data, wherein step (c) further comprises determining if the user is a given individual based on step (d).

5. The method of claim 4, wherein step (d) comprises comparing first spoken voice prints of at least two pieces of alias data against respective stored voice prints of the user speaking each of said pieces of alias data.

6. The method of claim 1, further comprising sending out an alert if the user is determined not to be a given individual in step (c).

7. The method of claim 1, further comprising informing the user to proceed with the user's travel plans if the user is determined to be a given individual in step (c).

8. The method of claim 1, further comprising informing the user to proceed with the user's travel plans if the user is determined to be a given individual in step (c).

9. The method of claim 1, further comprising informing the user to proceed to a boarding area, if the user is determined to be a given individual in step (c).

10. The method of claim 1, further comprising informing the user to board if the user is determined to be a given individual in step (c).

11. The method of claim 1, wherein said method is implemented in a computer system.

12. A machine readable medium storing instructions that, if executed by a computer system, causes the computer system to perform a set of operations comprising the steps of:
   (a) comparing at least one first spoken voice print of a user speaking at least one piece of personal data against a first stored voice print of the user speaking said at least one piece of personal data;
   (b) comparing at least one second spoken voice print of the user speaking at least one piece of travel data against a second stored voice print of the user speaking said piece of travel data; and
   (c) determining if the user is a given individual based the results of step (a) and step (b).

13. The machine readable medium of claim 12, wherein step (a) comprises comparing first spoken voice prints of at least two pieces of personal data against respective stored voice prints of the user speaking each of said pieces of personal data.

14. The machine readable medium of claim 12, wherein step (b) comprises comparing first spoken voice prints of at least two pieces of travel data against respective stored voice prints of the user speaking each of said pieces of travel data.

15. The machine readable medium of claim 12, wherein said set of operations further comprises the step of:
   (d) comparing at least one third spoken voice print of the user speaking at least one piece of alias data against a stored voice print of the user speaking said piece of alias data, wherein step (c) further comprises determining if the user is a given individual based on step (d).

16. The machine readable medium of claim 15, wherein step (d) comprises comparing first spoken voice prints of at least two pieces of alias data against respective stored voice prints of the user speaking each of said pieces of alias data.

17. The machine readable medium of claim 12, wherein said set of instructions further comprises sending out an alert if the user is determined not to be a given individual in step (c).

18. The machine readable medium of claim 12, wherein said set of instructions further comprises informing the user to proceed with the user's travel plans if the user is determined to be a given individual in step (c).

19. The machine readable medium of claim 12, wherein said set of instructions further comprises informing the user to proceed with the user's travel plans if the user is determined to be a given individual in step (c).

20. The machine readable medium of claim 12, wherein said set of instructions further comprises informing the user to proceed to a boarding area, if the user is determined to be a given individual in step (c).

21. The machine readable medium of claim 12, wherein said set of instructions further comprises informing the user to board if the user is determined to be a given individual in step (c).

22. A computer system implementing a method for identity verification comprising the steps of:
(a) comparing at least one first spoken voice print of a user speaking at least one piece of personal data against a first stored voice print of the user speaking said at least one piece of personal data;
(b) comparing at least one second spoken voice print of the user speaking at least one piece of travel data against a second stored voice print of the user speaking said piece of travel data; and
(c) determining if the user is a given individual based the results of step (a) and step (b).

23. The computer system of claim 22, wherein step (a) comprises comparing first spoken voice prints of at least two pieces of personal data against respective stored voice prints of the user speaking each of said pieces of personal data.

24. The computer system of claim 22, wherein step (b) comprises comparing first spoken voice prints of at least two pieces of travel data against respective stored voice prints of the user speaking each of said pieces of travel data.

25. The computer system of claim 22, wherein said method further comprises the step of:
(d) comparing at least one third spoken voice print of the user speaking at least one piece of alias data against a stored voice print of the user speaking said piece of alias data, wherein step (c) further comprises determining if the user is a given individual based on step (d).

26. The computer system of claim 25, wherein step (d) comprises comparing first spoken voice prints of at least two pieces of alias data against respective stored voice prints of the user speaking each of said pieces of alias data.

27. The computer system of claim 22, wherein said method further comprises sending out an alert if the user is determined not to be a given individual in step (c).

28. The computer system of claim 22, wherein said method further comprises informing the user to proceed with the user's travel plans if the user is determined to be a given individual in step (c).

29. The computer system of claim 22, wherein said method further comprises informing the user to proceed with the user's travel plans if the user is determined to be a given individual in step (c).

30. The computer system of claim 22, wherein said method further comprises informing the user to proceed to a boarding area, if the user is determined to be a given individual in step (c).

31. The computer system of claim 22, wherein said method further comprises informing the user to board if the user is determined to be a given individual in step (c).

32. A method for controlling the use of an object comprising the steps of:
(a) comparing at least one first spoken voice print of a user speaking at least one piece of personal data against a first stored voice print of the user speaking said at least one piece of personal data;
(b) comparing at least one second spoken voice print of the user speaking at least one piece of object identification data against a second stored voice print of the user speaking said piece of object identification data; and
(c) determining if the user is allowed to use said object based on the results of steps (a) and (b).

33. The method of claim 32, wherein step (a) comprises comparing first spoken voice prints of at least two pieces of personal data against respective stored voice prints of the user speaking each of said pieces of personal data.

34. The method of claim 32, wherein step (b) comprises comparing first spoken voice prints of at least two pieces of object identification data against respective stored voice prints of the user speaking each of said pieces of alias data.

35. The method of claim 32, wherein said personal data comprises at least one portion of the user's name.

36. The method of claim 32, wherein said object comprises an electronic device.

37. The method of claim 36, wherein said object comprises a portable electronic device.

38. The method of claim 36, wherein said object comprises a hand held electronic device.

39. The method of claim 32, wherein said object comprises a vehicle.

40. The method of claim 32, wherein said object comprises a test.

41. The method of claim 40, wherein said test comprises a test printed on paper.

42. The method of claim 40, wherein said test comprises an electronic test.

43. A machine readable medium storing instructions that, if executed by a computer system, causes the computer system to perform a set of operations comprising the steps of:
(a) comparing at least one first spoken voice print of a user speaking at least one piece of personal data against a first stored voice print of the user speaking said at least one piece of personal data;
(b) comparing at least one second spoken voice print of the user speaking at least one piece of object identification data against a second stored voice print of the user speaking said piece of object identification data; and
(c) determining if the user is allowed to use said object based on the results of steps (a) and (b).

44. The machine readable medium of claim 43, wherein step (a) comprises comparing first spoken voice prints of at least two pieces of personal data against respective stored voice prints of the user speaking each of said pieces of personal data.

45. The machine readable medium of claim 43, wherein step (b) comprises comparing first spoken voice prints of at least two pieces of object identification data against respective stored voice prints of the user speaking each of said pieces of alias data.

46. The machine readable medium of claim 43, wherein said personal data comprises at least one portion of the user's name.

47. The machine readable medium of claim 43, wherein said object comprises an electronic device.

48. The machine readable medium of claim 47, wherein said object comprises a portable electronic device.

49. The machine readable medium of claim 47, wherein said object comprises a hand held electronic device.

50. The machine readable medium of claim 43, wherein said object comprises a vehicle.

51. The machine readable medium of claim 43, wherein said object comprises a test.

52. The machine readable medium of claim 51, wherein said test comprises a test printed on paper.

53. The machine readable medium of claim 51, wherein said test comprises an electronic test.

54. A computer system implementing a method for controlling access to an object comprising the steps of:
  (a) comparing at least one first spoken voice print of a user speaking at least one piece of personal data against a first stored voice print of the user speaking said at least one piece of personal data;
  (b) comparing at least one second spoken voice print of the user speaking at least one piece of object identification data against a second stored voice print of the user speaking said piece of object identification data; and
  (c) determining if the user is allowed to use said object based on the results of steps (a) and (b).

55. The computer system of claim 54, wherein step (a) comprises comparing first spoken voice prints of at least two pieces of personal data against respective stored voice prints of the user speaking each of said pieces of personal data.

56. The computer system of claim 54, wherein step (b) comprises comparing first spoken voice prints of at least two pieces of object identification data against respective stored voice prints of the user speaking each of said pieces of alias data.

57. The computer system of claim 54, wherein said personal data comprises at least one portion of the user's name.

58. The computer system of claim 54, wherein said object comprises an electronic device.

59. The computer system of claim 58, wherein said object comprises a portable electronic device.

60. The computer system of claim 58, wherein said object comprises a hand held electronic device.

61. The computer system of claim 54, wherein said object comprises a vehicle.

62. The computer system of claim 54, wherein said object comprises a test.

63. The computer system of claim 62, wherein said test comprises a test printed on paper.

64. The computer system of claim 62, wherein said test comprises an electronic test.

65. A method for controlling the use of a service comprising the steps of:
  (a) comparing at least one first spoken voice print of a user speaking at least one piece of personal data against a first stored voice print of the user speaking said at least one piece of personal data;
  (b) comparing at least one second spoken voice print of the user speaking at least one piece of service identification data against a second stored voice print of the user speaking said piece of service identification data; and
  (c) determining if the user is allowed to use said service based on the results of steps (a) and (b).

66. The method of claim 65, wherein step (a) comprises comparing first spoken voice prints of at least two pieces of personal data against respective stored voice prints of the user speaking each of said pieces of personal data.

67. The method of claim 65, wherein step (b) comprises comparing first spoken voice prints of at least two pieces of service identification data against respective stored voice prints of the user speaking each of said pieces of alias data.

68. The method of claim 65, wherein said personal data comprises at least one portion of the user's name.

69. The method of claim 65, wherein said service comprises at least one medical service.

70. The method of claim 65, wherein said method is implemented in a computer system.

71. A machine readable medium storing instructions that, if executed by a computer system, causes the computer system to perform a set of operations comprising the steps of:
  (a) comparing at least one first spoken voice print of a user speaking at least one piece of personal data against a first stored voice print of the user speaking said at least one piece of personal data;
  (b) comparing at least one second spoken voice print of the user speaking at least one piece of service identification data against a second stored voice print of the user speaking said piece of service identification data; and
  (c) determining if the user is allowed to use said service based on the results of steps (a) and (b).

72. The machine readable medium of claim 71, wherein step (a) comprises comparing first spoken voice prints of at least two pieces of personal data against respective stored voice prints of the user speaking each of said pieces of personal data.

73. The machine readable medium of claim 71, wherein step (b) comprises comparing first spoken voice prints of at least two pieces of service identification data against respective stored voice prints of the user speaking each of said pieces of alias data.

74. The machine readable medium of claim 71, wherein said personal data comprises at least one portion of the user's name.

75. The machine readable medium of claim 71, wherein said service comprises at least one medical service.

76. A computer system implementing a method for controlling access to a portable electronic device comprising the steps of:
  (a) comparing at least one first spoken voice print of a user speaking at least one piece of personal data against a first stored voice print of the user speaking said at least one piece of personal data;
  (b) comparing at least one second spoken voice print of the user speaking at least one piece of service identification data against a second stored voice print of the user speaking said piece of service identification data; and
  (c) determining if the user is allowed to use said service based on the results of steps (a) and (b).

77. The computer system of claim 76, wherein step (a) comprises comparing first spoken voice prints of at least two pieces of personal data against respective stored voice prints of the user speaking each of said pieces of personal data.

78. The computer system of claim 76, wherein step (b) comprises comparing first spoken voice prints of at least two pieces of service identification data against respective stored voice prints of the user speaking each of said pieces of alias data.

79. The computer system of claim 76, wherein said personal data comprises at least one portion of the user's name.

80. The computer system of claim 76, wherein said service comprises at least one medical service.

* * * * *